(12) United States Patent
Bang et al.

(10) Patent No.: US 11,356,176 B2
(45) Date of Patent: Jun. 7, 2022

(54) ELECTRONIC APPARATUS AND CONTROL METHOD THEREOF

(71) Applicant: SAMSUNG ELECTRONICS CO., LTD., Suwon-si (KR)

(72) Inventors: Woosub Bang, Suwon-si (KR); Dongjin Park, Suwon-si (KR); Youngjin Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/090,051

(22) Filed: Nov. 5, 2020

(65) Prior Publication Data

US 2021/0135754 A1    May 6, 2021

(30) Foreign Application Priority Data

Nov. 5, 2019    (KR) .......................... 10-2019-0140234

(51) Int. Cl.
*H04B 10/25* (2013.01)
*H04B 10/40* (2013.01)
*G02B 6/12* (2006.01)
*F21V 8/00* (2006.01)

(52) U.S. Cl.
CPC ........... *H04B 10/25* (2013.01); *G02B 6/0083* (2013.01); *G02B 6/12* (2013.01); *H04B 10/40* (2013.01)

(58) Field of Classification Search
CPC ...... H04B 10/25; H04B 10/40; G02B 6/0083; G02B 6/12
USPC .......................................................... 398/139
See application file for complete search history.

(56) References Cited

U.S. PATENT DOCUMENTS

| | | | |
|---|---|---|---|
| 6,771,904 B1 * | 8/2004 | Sasaki ................ | H04B 10/0775 398/16 |
| 2013/0343748 A1 * | 12/2013 | Benou ............... | H04B 10/07957 398/29 |
| 2016/0041354 A1 * | 2/2016 | Guenter ............... | G02B 6/4434 385/86 |
| 2017/0019169 A1 * | 1/2017 | Yamamoto ........... | H04B 10/073 |
| 2018/0332371 A1 * | 11/2018 | Suzuki ................... | H04B 10/25 |
| 2020/0350990 A1 * | 11/2020 | Beattie, Jr. ............. | H04B 10/40 |

FOREIGN PATENT DOCUMENTS

| | | |
|---|---|---|
| KR | 10-2018-0068678 A | 6/2018 |
| KR | 10-2019-0020578 A | 3/2019 |

* cited by examiner

*Primary Examiner* — Dalzid E Singh
(74) *Attorney, Agent, or Firm* — Sughrue Mion, PLLC

(57) ABSTRACT

Disclosed is an electronic apparatus transmitting or receiving a first optical signal for optical communication to and from an external apparatus through an optical cable, identifying light emitting characteristics of the optical cable, and transmitting a second optical signal corresponding to the identified light emitting characteristics of the optical cable through the optical cable.

18 Claims, 8 Drawing Sheets

ELECTRONIC APPARATUS AND CONTROL METHOD THEREOF

CROSS-REFERENCE TO RELATED APPLICATION

This application is based on and claims priority under 35 U.S.C. § 119 to Korean Patent Application No. 10-2019-0140234 filed on Nov. 5, 2019 in the Korean Intellectual Property Office, the disclosure of which is incorporated by reference herein in its entirety.

BACKGROUND

Field

The disclosure relates to an electronic apparatus and a control method thereof, and more particularly to an electronic apparatus which performs optical communication through an optical cable, and a control method thereof.

Description of the Related Art

Recently, quality of an image displayable on a television (TV) has gone beyond high definition (HD) and reached an ultra-high definition (UHD) level. The TV has employed an optical cable to quickly and stably receive high-quality image data. Meanwhile, the TV serves not only to display an image but also as an interior decoration that creates an ambience of a space where the TV is installed. Therefore, a feeling of oneness and stability given by the installation space may vary depending on how the TV, the optical cable, etc. harmonize with the installation space.

SUMMARY

An aspect of the disclosure is to provide an electronic apparatus and a control method thereof, in which an optical cable connected between an electronic apparatus and an external apparatus is seen as assimilated into surroundings so that a user can visually feel comfortable or stable at the surroundings.

According to an embodiment of the disclosure, there is provided an electronic apparatus including an optical communicator to which an optical cable is connectable, and a processor configured to control the optical communicator to transmit or receive a first optical signal for optical communication to and from an external apparatus through the optical cable, identify light emitting characteristics of the optical cable, and control the optical communicator to transmit a second optical signal corresponding to the identified light emitting characteristics of the optical cable through the optical cable.

The processor may be configured to identify the light emitting characteristics of the optical cable based on surrounding characteristics of the electronic apparatus.

The processor may be configured to identify the light emitting characteristics of the optical cable based on a received user input.

The light emitting characteristics of the optical cable may include at least one of transparency of the optical cable or color of the optical cable.

The optical communicator may include a first optical device that outputs the first optical signal, and a second optical device that outputs the second optical signal, the first optical device may be configured to output the first optical signal to a first fiber of the optical cable, and the second optical device may be configured to output the second optical signal to a second fiber of the optical cable surrounding the first fiber.

Characteristics of the second optical signal may include a wavelength of the second optical signal.

The surrounding characteristics may include background color characteristics of the electronic apparatus.

The surrounding characteristics may include ambient brightness of the electronic apparatus.

The processor may be configured to identify the light emitting characteristics of the optical cable based on ambient brightness of the electronic apparatus, and control the optical communicator to raise the transparency of the optical cable as the ambient brightness becomes higher.

The electronic apparatus may further include a display, and the processor may be configured to control the light emitting characteristics of the optical cable to be adjusted based on color characteristics of an image displayed on the display.

The electronic apparatus may further include a display, and the processor may be configured to display an image on the display based on the first optical signal received from the external apparatus through the optical communicator, and transmit information about the surrounding characteristics to the external apparatus.

The processor may be configured to identify the surrounding characteristics based on information received from the external apparatus through the optical communicator.

According to an embodiment of the disclosure, there is provided a method of controlling an electronic apparatus, including transmitting or receiving a first optical signal for optical communication to and from an external apparatus through an optical cable, identifying light emitting characteristics of the optical cable, and transmitting a second optical signal corresponding to the identified light emitting characteristics of the optical cable through the optical cable.

The identifying the light emitting characteristics of the optical cable may include identifying the light emitting characteristics of the optical cable based on surrounding characteristics of the electronic apparatus.

The identifying the light emitting characteristics of the optical cable may include identifying the light emitting characteristics of the optical cable based on a received user input.

The light emitting characteristics of the optical cable may include at least one of transparency of the optical cable or color of the optical cable.

Characteristics of the second optical signal may include a wavelength of the second optical signal.

The surrounding characteristics may include background color characteristics of the electronic apparatus.

The surrounding characteristics may include ambient brightness of the electronic apparatus.

The transmitting the second optical signal may include raising the transparency of the optical cable as the ambient brightness becomes higher.

According to an embodiment of the disclosure, there is provided a recording medium, in which a computer program is stored including a code for performing a control method of an electronic apparatus as a computer readable code, the control method including: transmitting or receiving a first optical signal for optical communication to and from an external apparatus through an optical cable, identifying light emitting characteristics of the optical cable, and transmitting a second optical signal corresponding to the identified light emitting characteristics of the optical cable through the optical cable.

BRIEF DESCRIPTION OF THE DRAWINGS

The above and/or other aspects will become apparent and more readily appreciated from the following description of embodiments, taken in conjunction with the accompanying drawings, in which.

DETAILED DESCRIPTION

Figure 1:
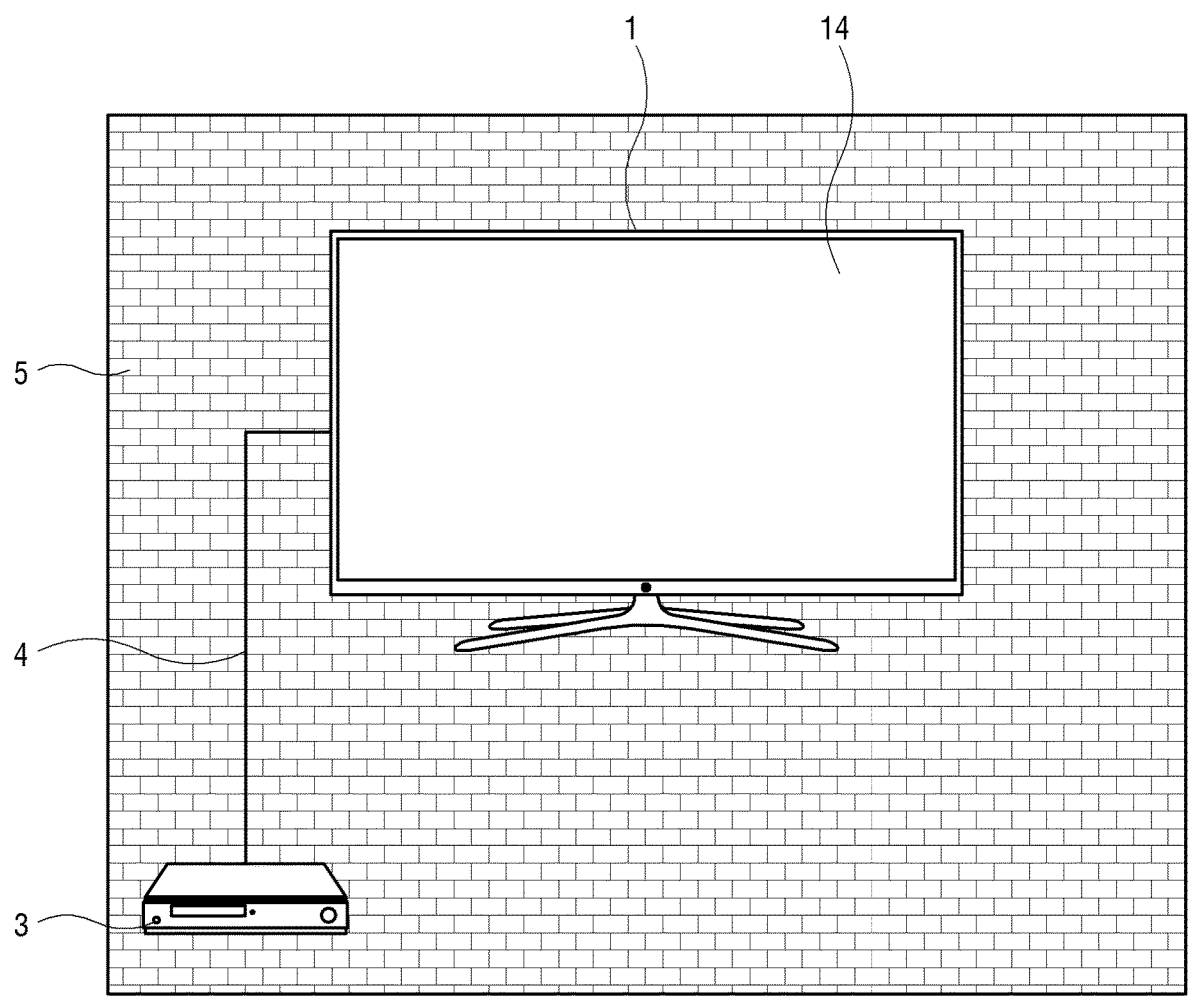
FIG. 1 illustrates an electronic apparatus according to an embodiment of the disclosure.

Below, embodiments of the disclosure will be described in detail with reference to accompanying drawings. In the description of the following embodiments, elements illustrated in the accompanying drawings will be referenced, and like numerals or symbols set forth in the drawings refer to like elements having substantially the same operations. In the disclosure, at least one among a plurality of elements refers to not only all the plurality of elements but also both each one of the plurality of elements excluding the other elements and a combination thereof.

FIG. 1 illustrates an electronic apparatus 1 according to an embodiment of the disclosure. As shown in FIG. 1, the electronic apparatus 1 may include a display 14, and display an image through the display 14. The electronic apparatus 1 may include not only an image displaying apparatus such as a television (TV), a tablet computer, a portable media player, a wearable device, a video wall, an electronic frame, etc., but also various kinds of apparatuses without the display 14, for example, an image processing apparatus such as a set-top box, etc.; a home appliance such as a refrigerator, a washing machine, etc.; and an information processing apparatus such as a computer, etc. However, for convenience of description, it will be assumed below that the electronic apparatus 1 is embodied by the TV.

The electronic apparatus 1 may display an image based on image data. The image data may be related to broadcast content of a terrestrial, cable, satellite or the like wave, but not limited thereto. The electronic apparatus 1 may receive image data of various pieces of content from an external apparatus 3, and display an image of various pieces of content based on the image data.

The external apparatus 3 may provide the image data to the electronic apparatus 1. The external apparatus 3 may refer to a peripheral or auxiliary apparatus that provides the image data of various pieces of content, and may include a media box. The external apparatus 3 may also be called a one connect (OC) box because it is an apparatus connected to the electronic apparatus 1 through a single optical cable 4. The external apparatus 3 may not only transmit data such as image data, audio data, control data, etc. but also supply power through the single optical cable 4.

The electronic apparatus 1 may perform optical communication with the external apparatus 3 through the optical cable 4. The optical cable 4 may include a plurality of fibers, and each fiber may totally reflect incident light based on difference in a refractive index between a cladding and a core. Through the optical cable 4 using the total internal reflection of the light, the electronic apparatus 1 may transmit an optical signal to the external apparatus 3 or receive an optical signal from the external apparatus 3. As described above, the electronic apparatus 1 may use the optical cable 4 to receive not only data such as image data, audio data, control data, etc. but also power, and therefore the optical cable 4 may be provided as a data cable and a power cable are integrated.

The optical cable 4 may have its own unique light emitting characteristics. For example, the optical cable 4 may emit light by diffusing light incident to the fiber, and emit light to a lateral side along its lengthwise direction based on the diffusion of the light. However, the light emission in the optical cable 4 is not limited to this form, but may be variously designed. For example, the light incident to the fiber may leak out for the emission of the light.

The electronic apparatus 1 identifies the light emitting characteristics of the optical cable 4, and transmits an optical signal, which corresponds to the identified light emitting characteristics of the optical cable 4, to the optical cable 4. The light emitting characteristics may for example include color, brightness, strength, transparency, etc. In a case of color, the electronic apparatus 1 transmits the optical signals corresponding to red light, green light and blue light to the optical cable 4 so that the optical cable 4 can emit the red light, the green light and the blue light. The electronic apparatus 1 controls the optical signal corresponding to each color, and thus controls the color represented by the optical cable 4. Meanwhile, in a case of transparency, the electronic apparatus 1 controls the characteristics of the optical signal corresponding to white light, for example, intensity, strength, etc., thereby controlling the transparency of the optical cable 4.

The electronic apparatus 1 may be provided in an installation space. For example, when the electronic apparatus 1 is provided in a living room of a home, the installation space may be the living room in the home. However, the installation space is not limited to the living room in the home, but may be variously set according to an installation place for the electronic apparatus 1. However, for convenience of description, it will be assumed that the installation space is the living room in the home and the electronic apparatus 1 is provided on a certain wall 5 of the living room. In this case, it will be assumed that the optical cable 4 is connected to the electronic apparatus 1 provided on the wall 5, and extended along the wall 5 and connected to the external apparatus 3.

The electronic apparatus 1 may identify surrounding characteristics, and the light emitting characteristics of the optical cable 4 may be controlled based on the surrounding characteristics. For example, when the optical cable 4 is extended along the wall 5 of the living room, the electronic apparatus 1 may obtain information about the brightness of the living room, the color of the wall 5, etc. In this case, the electronic apparatus 1 may control the optical cable 4 to be adjusted in the light emitting characteristics, e.g. the transparency according to the brightness of the living room, or emit light with color corresponding to the color of the wall 5. However, the surrounding characteristics are not limited to the brightness of the living room and the color of the wall 5, and therefore various factors of surroundings may be taken into account.

Figure 2:
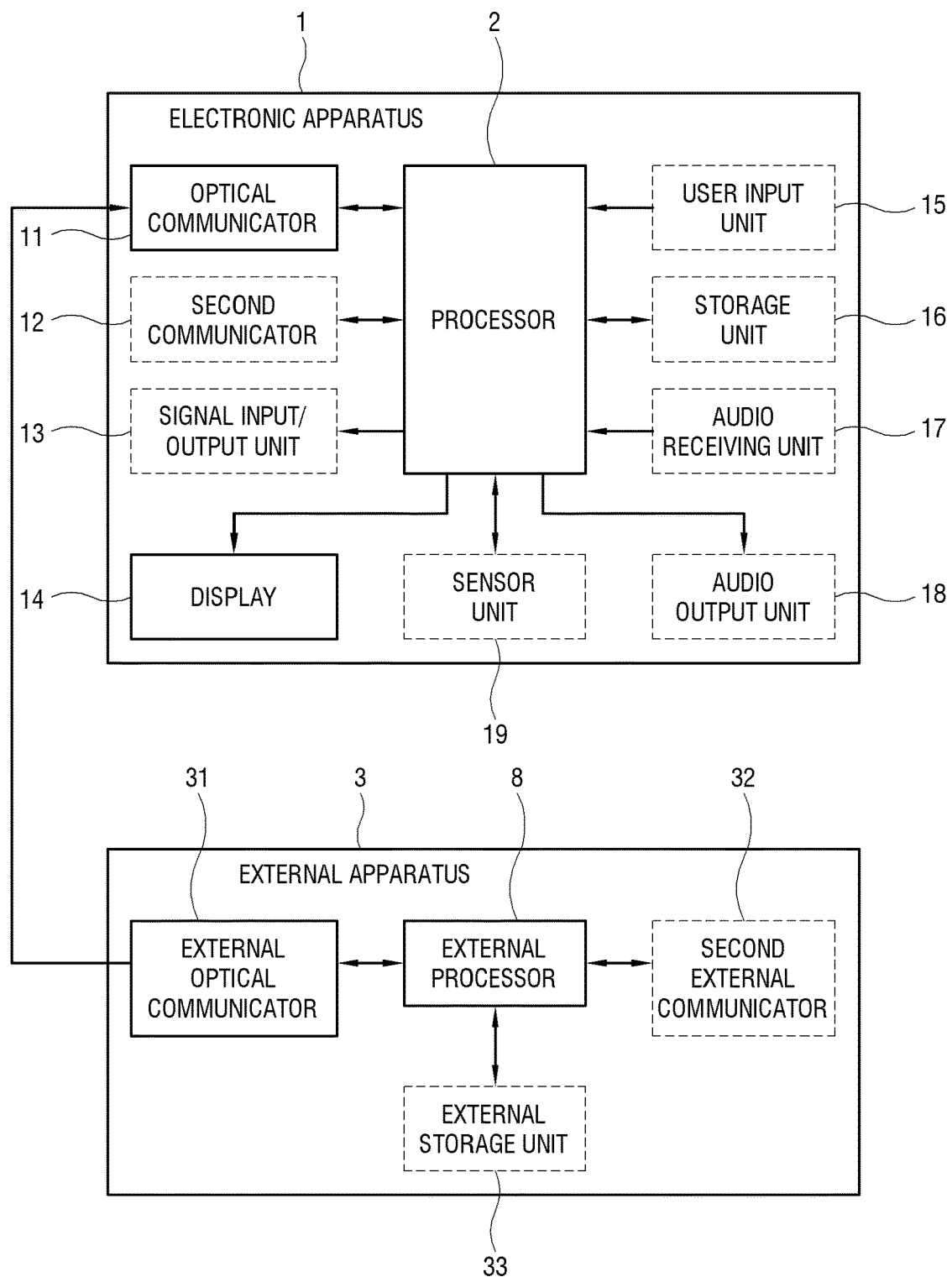
FIG. 2 illustrates a configuration of the electronic apparatus of FIG. 1.

FIG. 2 illustrates a configuration of the electronic apparatus of FIG. 1. As shown in FIG. 2, the configuration of the electronic apparatus 1 will be described below. In this embodiment, it will be described that the electronic apparatus 1 is a TV. However, the electronic apparatus 1 may be embodied by various kinds of apparatuses, and therefore the electronic apparatus 1 is not limited to this embodiment. The electronic apparatus 1 may not be embodied by the display apparatus, and the electronic apparatus 1 in this case may not include the display 14 and the like elements for displaying an image. For example, when the electronic apparatus 1 is embodied by a set-top box, the electronic apparatus 1 may output an image signal to an external apparatus such as a TV through the signal input/output unit 13.

The electronic apparatus 1 may include an optical communicator 11. The optical communicator 11 is connected to the optical cable 4, and configured to transmit or receive an optical signal through the optical cable 4. The optical signal transmitted or received through the optical communicator 11 may include not only data such as video data, audio data, control data, etc. but also electric power.

The optical communicator 11 may make the optical cable emit light and the light emitting characteristics of the optical cable 4 be adjusted based on the optical signal. The optical communicator 11 may include an optical device to transmit the optical signal. The optical device may include a vertical cavity surface emitting laser (VCSEL), a semiconductor diode, etc. Further, the optical communicator 11 may include an optical device such as a photodiode (PD) or the like to receive the optical signal. For example, when the optical communicator 11 is embodied by the VCSEL or the like, an external communicator 31 of the external apparatus 3 may be embodied by the PD. When the external optical communicator 31 of the external apparatus 3 is embodied by the VCSEL or the like, the optical communicator 11 may be embodied by the PD. The VCSEL or the like and the PD for the optical communicator 11 may be a single module or chip. However, the optical communicator 11 may include various configurations for transmitting or receiving the optical signal besides the VCSEL or the like and the PD.

The electronic apparatus 1 may include a display 14. The display 14 includes a display panel capable of displaying an image on a screen. The display panel is provided to have a light receiving structure such as a liquid crystal type, or a self-emissive structure such as an organic light emitting diode (OLED) type. The display 14 may include an additional element according to the structures of the display panel. For example, when the display panel is the liquid crystal type, the display 14 includes a liquid crystal display panel, a backlight unit configured to emit light, and a panel driving substrate configured to drive liquid crystal of the liquid crystal display panel. However, the display 14 may be omitted when the electronic apparatus 1 is embodied by the set-top box or the like.

The electronic apparatus 1 may include a processor 2. The processor 2 may include a control program (or instruction) for performing control with regard to general elements of the first device 10, a nonvolatile memory in which the control program is installed, a volatile memory in which at least a part of the installed control program is loaded, and at least one processor or central processing unit (CPU) for executing a loaded control program. Further, such a control program may be stored in any electronic apparatus other than the electronic apparatus 1. The control program may include a program(s) actualized in the form of at least one among a basis input/output system (BIOS), a device driver, an operating system, a firmware, a platform, and an application. According to an embodiment, the application may be previously installed or stored when the electronic apparatus 1 is manufactured, or may be installed based on application data received from the outside when it is used in the future. The application data may for example be downloaded from an application market and the like server. Such a server is an example of a computer program product, but not limited to this example. The processor 2 includes one or more hardware processors which may be embodied as a CPU, a chipset, a buffer, a circuit, etc. mounted onto a printed circuit board (PCB), and may also be designed as a system on chip (SoC).

The processor 2 may be configured to transmit or receive a first optical signal for optical communication through the optical communicator 11, or transmit a second optical signal corresponding to the light emitting characteristics of the optical cable 4. For example, the processor 2 may use the first optical signal to receive image data from the external apparatus 3. Further, the processor 2 may identify the light emitting characteristics of the optical cable 4, and transmit the second optical signal corresponding to the identified light emitting characteristics of the optical cable 4 through the optical cable 4.

However, the configuration of the electronic apparatus 1 is not limited to the foregoing configuration, and therefore may be designed to exclude some from the elements or include another element in addition to the foregoing elements. Below, elements which may be designed to be included in the electronic apparatus 1 will be described in detail. However, as described above, when the external apparatus 3 is embodied as the media box, some or all among the elements of the electronic apparatus 1 to be described below may be included in the external apparatus to be described subsequently or integrated into the configuration of the corresponding external apparatus 3.

The electronic apparatus 1 may include a second communicator 12. The second communicator 12 may perform data communication with another electronic apparatus on a network, for example, the external apparatus 3. To this end, the second communicator 12 may include an interactive communication circuit that includes at least one of elements, such as a communication module, a communication chip, etc. corresponding to various wired and wireless communication protocols. For example, the second communicator 12 may be embodied by a wireless communication module that performs wireless communication based on Wi-Fi using an access point (AP), a wireless communication module that performs one-to-one direct wireless communication based on Bluetooth or the like, or a local area network (LAN) card connected to a router or a gateway by a wire.

The second communicator 12 may communicate with a remote controller 7, a smartphone, etc. separated from the main body of the electronic apparatus 1 (FIG. 1). For example, when the remote controller 7, the smartphone, etc. receives a user input from a user 6, the second communicator 12 may receive a signal about the user input from the remote controller 7, the smartphone, etc. In this case, a remote-control application may be installed in the smartphone or the like. The second communicator 12 may receive a signal about a user input from the remote controller 7, the smartphone, etc. through Wi-Fi, Bluetooth, IrDA, etc. In this case, the second communicator 12 may include a configuration for transmitting and receiving data to and from the remote controller 7, the smartphone, etc. through Wi-Fi, Bluetooth, IrDA, etc. However, when the second communicator 12 is provided in the electronic apparatus 1, the second communicator 12 may be provided as included in or separated from the optical communicator 11.

The electronic apparatus 1 may include the signal input/output unit 13. The signal input/output unit 13 may be connected to a portable storage medium, a mobile player, or the like in a 1:1 or 1:N (where, N is a natural number) mode by a wire, thereby performing data communication with them. The signal input/output unit 13 may for example include a connector, a port, etc. based on preset transmission standards, like a high definition multimedia interface (HDMI) port, a display port, a digital video interactive (DVI) port, a thunderbolt, a universal serial bus (USB) port, etc. However, when the signal input/output unit 13 is provided in the electronic apparatus 1, the signal input/output unit 13 may be provided as included in or separated from the optical communicator 11.

The electronic apparatus 1 may include the user input unit 15. The user input unit 15 includes circuitry related to various input interfaces provided to be controlled by the user 6 to make a user input. The user input unit 15 may be variously configured according to the kinds of electronic apparatus 1, and may for example include a mechanical or electronic button of the electronic apparatus 1, a touch pad, a touch screen installed in the display 14, etc.

The electronic apparatus 1 may include a storage unit 16. The storage unit 16 is configured to store digitalized data. The storage unit 16 includes a nonvolatile storage in which data is retained regardless of whether power is on or off, and a volatile memory into which data to be processed by the processor 2 is loaded and in which data is retained only when power is on. The storage includes a flash memory, a hard-disc drive (HDD), a solid-state drive (SSD), a read only memory (ROM), etc., and the memory includes a buffer, a random-access memory (RAM), etc.

The electronic apparatus 1 may include an audio receiving unit 17. The audio receiving unit 17 may receive a voice command of the user 6. The audio receiving unit 17 may be embodied by a microphone, and may be provided in the main body of the electronic apparatus 1, or may be provided in the remote controller 7, the smartphone, etc. separated from the main body of the electronic apparatus 1. For example, the audio signal collected through the audio receiving unit 17 provided in the remote controller 7, the smartphone, etc. may be digitalized and received in the second communicator 12.

The electronic apparatus 1 may include an audio output unit 18. The audio output unit 18 may output various sounds based on an audio signal. The audio output unit 18 may be embodied by at least one loudspeaker. The audio output unit 18 may be provided in the electronic apparatus 1, or may be embodied by an external loudspeaker provided in the outside. In this case, the audio output unit 18 may be provided as included in the optical communicator 11, and configured to output an audio signal through the optical communicator 11.

The electronic apparatus 1 may include a sensor unit 19. The sensor unit 19 may include at least one sensor for detecting surrounding characteristics. For example, the sensor unit 19 may include a brightness sensor to detect ambient brightness. The sensor unit 19 may further include an image acquirer to capture or photograph a front side of the electronic apparatus 1, and detect the ambient brightness based on an image obtained through the image acquirer. The image acquirer may be embodied by at least one camera.

The electronic apparatus 1 may further include a signal processor. The signal processor may perform various video or audio processes to display an image. To this end, the signal processor may include modules corresponding to various processes, such as a demultiplexer, a decoder, a scaler, an audio digital signal processor (DSP), an amplifier, etc. Here, some or all of such modules may be embodied as an SoC. For example, the demultiplexer, the decoder, the scaler and the like video processing modules may be embodied as a video processing SoC, and the audio DSP may be embodied as a chipset separately from the SoC.

Below, the configuration of the external apparatus 3 will be described in detail with reference to FIG. 2.

The external apparatus 3 may include the external optical communicator 31. The external optical communicator 31 may connect with the optical cable 4, and transmit or receive an optical signal through the optical cable 4. The external optical communicator 31 may transmit or receive the first optical signal for the optical communication to or from the electronic apparatus 1 like the optical communicator 11 of the electronic apparatus 1, and may transmit the second optical signal corresponding to the light emitting characteristics of the optical cable 4 to the optical cable 4.

When the optical communicator 11 is embodied by the VCSEL or the like, the external optical communicator 31 may be embodied by the PD. When the optical communicator 11 is embodied by the PD, the external optical communicator 31 may be embodied by the VCSEL or the like. The VCSEL or the like and the PD for the external optical communicator 31 may be provided as a single module or chip. However, the external optical communicator 31 may include various configurations for transmitting or receiving the optical signal besides the VCSEL or the like and the PD.

The external apparatus 3 may include a second external communicator 32. The second external communicator 32 may perform data communication with another electronic apparatus on the network, for example, the electronic apparatus 1. To this end, the second communicator 12 may include an interactive communication circuit that includes at least one of elements, such as a communication module, a communication chip, etc. corresponding to various wired and wireless communication protocols. For example, the second communicator 12 may be embodied by a wireless communication module that performs wireless communication based on Wi-Fi using an AP, a wireless communication module that performs one-to-one direct wireless communication based on Bluetooth or the like, or a LAN card connected to a router or a gateway by a wire.

The external apparatus 3 may include an external storage unit 33. The external storage unit 33 is configured to store digitalized data. The external storage unit 33 includes a nonvolatile storage in which data is retained regardless of whether power is on or off, and a volatile memory into which data to be processed by an external processor 8 is loaded and in which data is retained only when power is on.

The external apparatus 3 may include the external processor 8. The external processor 8 may include a control program (or instruction) for performing control with regard to general elements of the external apparatus 3, a nonvolatile memory in which the control program is installed, a volatile memory in which at least a part of the installed control program is loaded, and at least one processor or CPU for executing a loaded control program. Further, such a control program may be stored in any electronic apparatus other than the external apparatus 3. The control program may include a program(s) actualized in the form of at least one among a BIOS, a device driver, an operating system, a firmware, a platform, and an application. According to an embodiment, the application may be previously installed or stored when the external apparatus 3 is manufactured, or may be installed based on application data received from the outside when it is used in the future. The application data may for example be downloaded from an application market and the like server. Such a server is an example of a computer program product, but not limited to this example. The external processor 8 includes one or more hardware processors which may be embodied as a CPU, a chipset, a buffer, a circuit, etc. mounted onto a PCB. Alternatively, the external processor 8 may be designed as a system on chip (SoC).

Meanwhile, the processor 2 and the external processor 8 may exchange the first optical signal with each other for the optical communication using the optical cable 4, and may identify the light emitting characteristics of the optical cable 4, or transmit the second optical signal corresponding to the identified light emitting characteristics of the optical cable 4 to the optical cable 4. The processor 2 or the external processor 8 may use at least one of a machine learning, neural network, or deep learning algorithm as a rule-base or artificial intelligence (AI) algorithm to perform at least one of data analysis, process or result information generation for the foregoing operations.

For example, the processor 2 or external processor 8 may function as both a learner and a recognizer. The learner may perform a function of generating the learned neural network, and the recognizer may perform a function of recognizing (or inferring, predicting, estimating and identifying) the data based on the learned neural network. The learner may generate or update the neural network. The learner may obtain learning data to generate the neural network. For example, the learner may obtain the learning data from the storage unit 16 or external storage unit 33 or from the external server. The learning data may be data used for learning the neural network, and the data subjected to the foregoing operations may be used as the learning data to teach the neural network.

Before teaching the neural network based on the learning data, the learner may perform a preprocessing operation with regard to the obtained learning data or select data to be used in learning among a plurality of pieces of the learning data. For example, the learner may process the learning data to have a preset format, apply filtering to the learning data, or process the learning data to be suitable for the learning by adding/removing noise to/from the learning data. The learner may use the preprocessed learning data for generating the neural network set to perform the operations.

The learned neural network may include a plurality of neural networks (or layers). The nodes of the plurality of neural networks have weights, and the plurality of neural networks may be connected to one another so that an output value of a certain neural network can be used as an input value of another neural network. As an example of the neural network, there are a convolutional neural network (CNN), a deep neural network (DNN), a recurrent neural network (RNN), a restricted Boltzmann machine (RBM), a deep belief network (DBN), a bidirectional recurrent deep neural network (BRDNN) and deep Q-networks.

Meanwhile, the recognizer may obtain target data to perform the foregoing operations. The target data may be obtained from the storage unit 16 or the external storage unit 33, or from the outside. The target data may be data targeted for recognition of the neural network. Before applying the target data to the learned neural network, the recognizer may preprocess the obtained target data or select data to be used in the recognition among a plurality of pieces of target data. For example, the recognizer may process the target data to have a preset format, apply filtering to the target data, or add/remove noise to/from the target data, thereby processing the target data into data suitable for recognition. The recognizer applies the preprocessed target data to the neural network, thereby obtaining an output value output from the neural network. The recognizer may obtain a probability value or a reliability value together with the output value.

Figure 3:
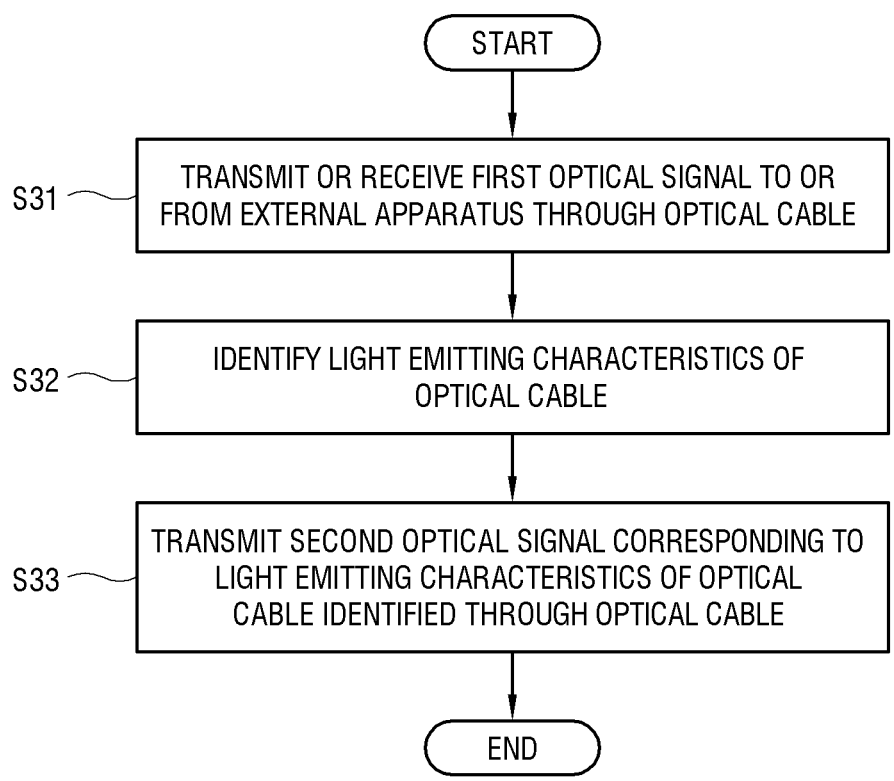
FIG. 3 illustrates a control method of the electronic apparatus of FIG. 1.

FIG. 3 illustrates a control method of the electronic apparatus of FIG. 1. Operations of FIG. 3 may be carried out by the processor 2 of the electronic apparatus 1.

As shown in FIG. 3, the processor 2 may transmit the first optical signal to the external apparatus 3 or receive the first optical signal from the external apparatus 3 through the optical cable 4 (S31).

Further, the processor 2 may identify the light emitting characteristics of the optical cable 4 (S32).

Further, the processor 2 may transmit the second optical signal corresponding to the identified light emitting characteristics of the optical cable 4 through the optical cable 4 (S33).

Like this, the processor 2 of the electronic apparatus 1 adjusts the light emitting characteristics of the optical cable 4 by transmitting the second optical signal through the optical cable 4 according to the surrounding characteristics so that the optical cable 4 can be seen as assimilated into the installation space, thereby making the user 6 visually feel comfortable or stable at the installation space.

Figure 4:
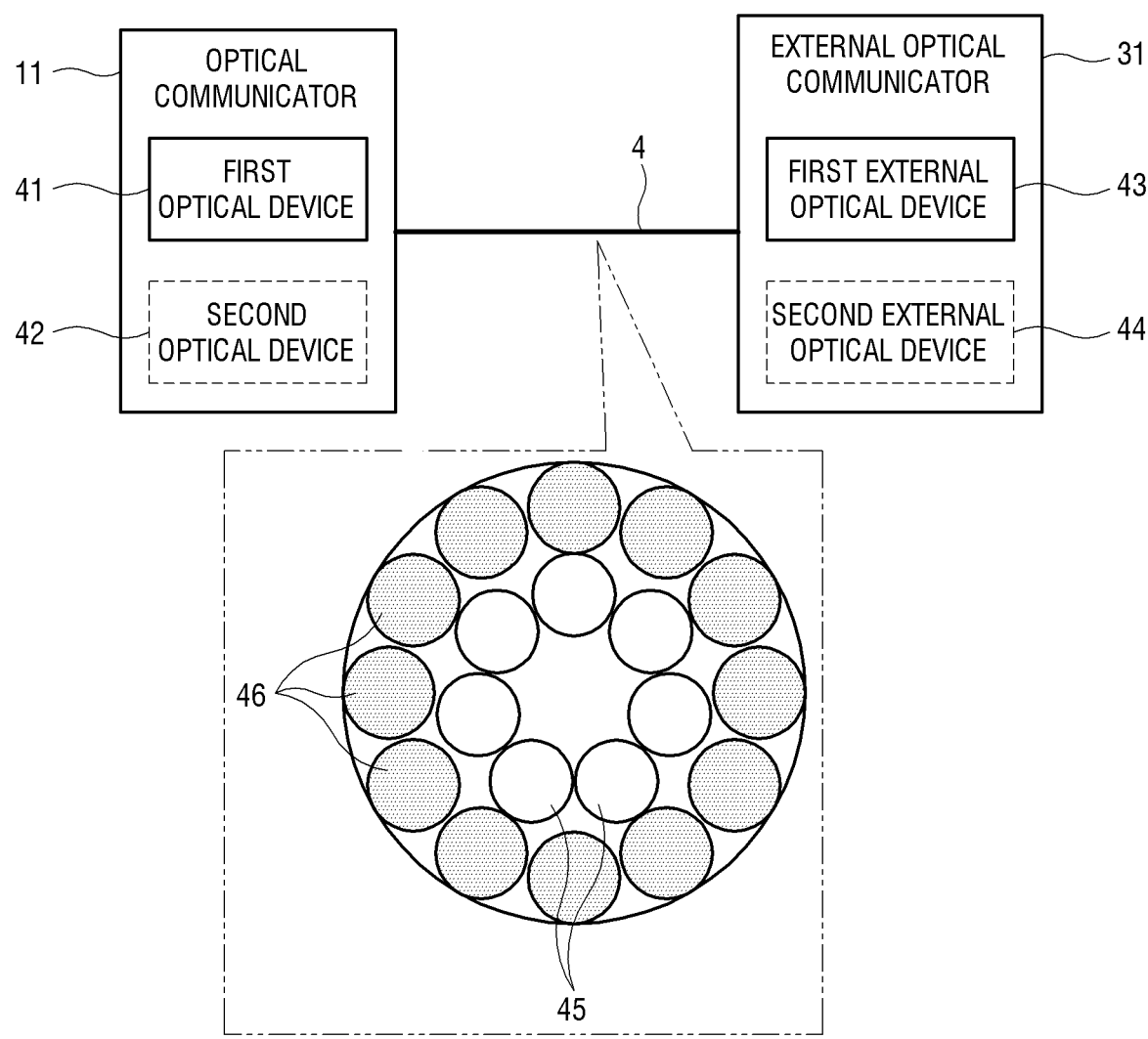
FIG. 4 illustrates a structure of an optical cable according to an embodiment of the disclosure.

FIG. 4 illustrates a structure of an optical cable according to an embodiment of the disclosure. As shown in FIG. 4, the optical cable 4 may include a first optical cable 45 for communication, and a second optical cable 46 for light emission. Each of the optical cables 45 and 46 may include a plurality of fibers. That is, the first optical signal for the optical communication may be transmitted through a first fiber of the first optical cable 45, and the second optical signal corresponding to the light emitting characteristics of the optical cable 4 or adjusting the light emitting characteristics of the optical cable 4 may be transmitted through a second fiber of the second optical cable 46.

The second fiber may be formed to surround the first fiber as shown in FIG. 4. However, the first fiber and the second fiber are not limited to such a form, but may have various forms in consideration of optical communication environments. For example, the first fiber may be formed to surround the second fiber, or the first fiber and the second fiber may be formed to zigzag.

Meanwhile, the optical communicator 11 of the electronic apparatus 1 may include a first optical device 41 for transmitting the first optical signal through the first fiber, and a second optical device 42 for transmitting the second optical signal through the second fiber. The external optical communicator 31 may include a first external optical device 43 corresponding to the first optical device 41 of the electronic apparatus 1, and a second external optical device 44 corresponding to the second optical device 42 of the electronic apparatus 1. When the electronic apparatus 1 transmits the optical signals, the first external optical device 43 and the second external optical device 44 may respectively receive the optical signals from the first optical device 41 and the second optical device 42. On the other hand, when the external apparatus 3 transmits the optical signal, the first optical device 41 or the second optical device 42 may receive the optical signal from the first external optical device 43 or the second external optical device 44.

However, the first optical device 41 and the first external optical device 43 may correspond to each other for the optical communication, but the second optical device 42 and the second external optical device 44 may not correspond to each other. For example, when the second optical device 42 is provided in the optical communicator 11 of the electronic apparatus 1, the second external optical device 44 may not be provided in the external optical communicator 31 of the external apparatus 3. On the other hand, when the second external optical device 44 is provided in the external optical communicator 31 of the external apparatus 3, the second optical device 42 may not be provided in the optical communicator 11 of the electronic apparatus 1.

The processor 2 may transmit the second optical signal corresponding to the light emitting characteristics of the optical cable 4 to the optical cable 4. For example, the processor 2 may control the second optical device 42 to thereby transmit the second optical signal corresponding to the light emitting characteristics of the optical cable 4 to the optical cable 4. In the case of color, the processor 2 may for example control the optical cable 4 to emit red light based on the second optical signal of about 620 nm to about 750 nm, green light based on the second optical signal of about 495 nm to about 750 nm, and blue light based on the second optical signal of about 450 nm to about 495 nm. However, the wavelength range of the second optical signal for emitting light with each color may be variously designed.

The processor 2 may control the optical cable 4 to emit white light based on combination of red light, green light and blue light. In other words, the processor 2 may control the transparency of the optical cable 4 to be adjusted based on the second optical signal of about 400 nm to about 1000 nm. For example, when the wavelength of the second optical signal becomes longer, intensity of white light decreases to thereby raise the transparency. On the other hand, when the wavelength of the second optical signal becomes shorter, intensity of white light increases to thereby lower the transparency Meanwhile, the foregoing operations may also be carried out by the external processor 8 of the external apparatus 3. That is, the external processor 8 may control the second external optical device 44 to transmit the second optical signal corresponding to the light emitting characteristics of the optical cable 4 to the optical cable 4 so that the optical cable 4 can represent various colors or adjust its transparency.

Like this, the electronic apparatus 1 can adjust the transparency or the like of the optical cable 4 to have visual effects as if the optical cable 4 is absent.

Figure 5:
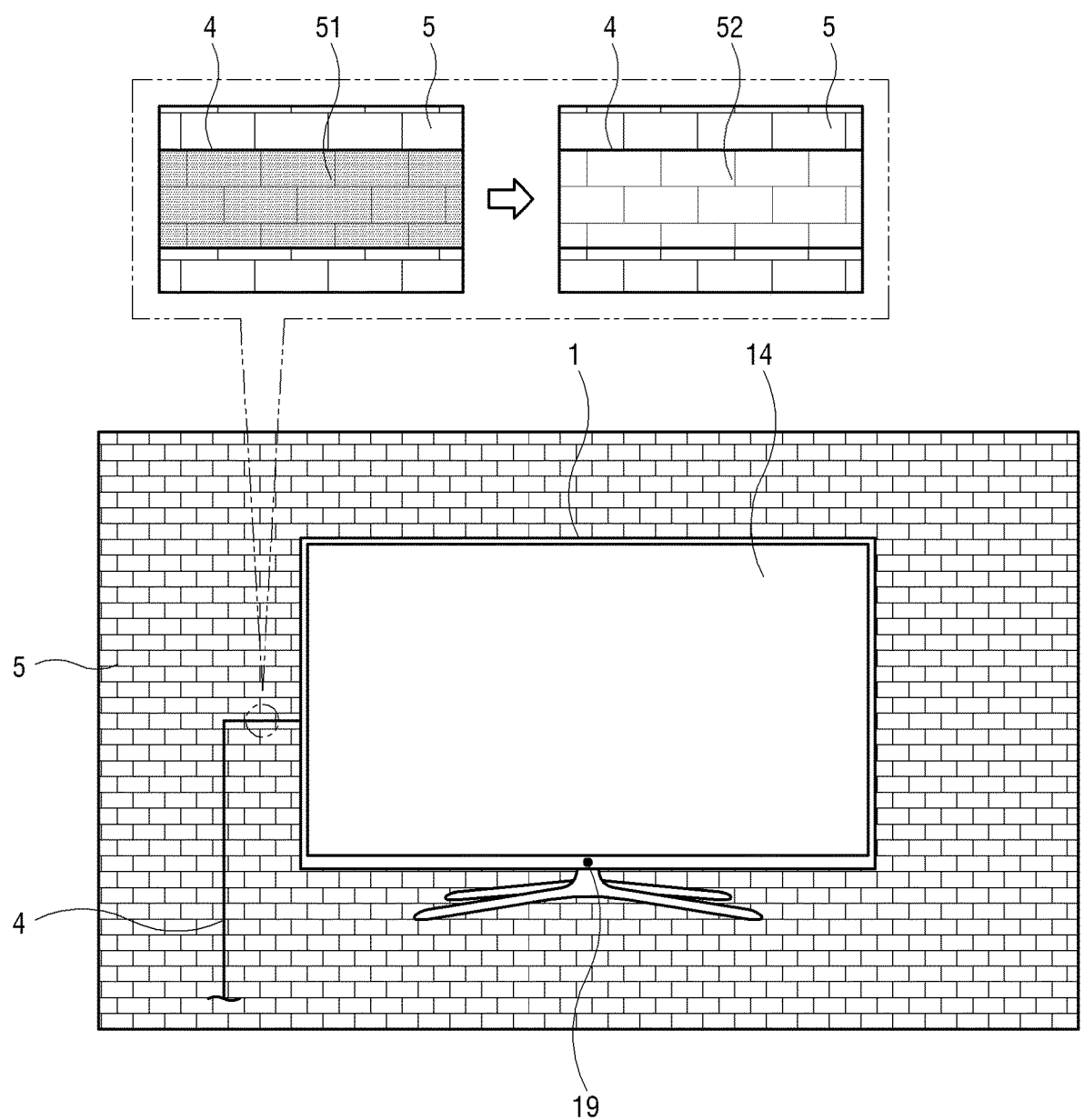
FIG. 5 illustrates an example that transparency of the optical cable is adjusted, in relation to operation S33 of FIG. 3.

FIG. 5 illustrates an example that transparency of the optical cable is adjusted, in relation to operation S33 of FIG. 3. As shown in FIG. 5, it will be assumed that the electronic apparatus 1 is provided in a certain wall 5 of the living room, and the optical cable 4 is connected to the electronic apparatus 1 provided in the wall 5 and extended along the wall 5.

The processor 2 of the electronic apparatus 1 may identify surrounding characteristics. For example, the surrounding characteristics may include the ambient brightness of the electronic apparatus 1. The processor 2 may identify the ambient brightness based on information about the ambient brightness obtained through the sensor unit 19. However, the information about the ambient brightness is not limited to only that obtained by the sensor unit 19, but the processor 2 may receive information about the ambient brightness obtained by the external apparatus 3 or another external apparatus and identify the ambient brightness based on the received information.

The processor 2 may control the light emitting characteristics of the optical cable 4 to be adjusted based on the identified ambient brightness. The optical cable 4 may have first light emitting characteristics 51 before being adjusted based on the identified ambient brightness and second light emitting characteristics 52 after being adjusted based on the identified ambient brightness. In this case, the first light emitting characteristics 51 may be an opaque state, and the second light emitting characteristics 52 may be a transparent state.

Alternatively, the surrounding characteristics may include a color of the background around the electronic apparatus 1, for example, the color of the wall 5. The processor 2 may identify the color of the wall 5 based on the information about the color of the wall 5 based on the information about the color of the wall 5 obtained by the sensor unit 19. However, as described above, the processor 2 may obtain information about the color of the wall 5 obtained by the external apparatus 3 or another external apparatus.

The processor 2 may control the light emitting characteristics of the optical cable 4 to be adjusted based on the identified color of the wall 5. The first light emitting characteristics 51 of the optical cable 4 may for example be an achromatic color, and the second light emitting characteristics 52 may be the color of the wall 5 or a color similar to the color of the wall 5.

Meanwhile, the foregoing operation may be carried out by even the external processor 8. In other words, the external processor 8 may identify the light emitting characteristics, for example, the color or transparency of the optical cable 4 based on the surrounding characteristics of the electronic apparatus 1, and control the external optical communicator 31 to output the second optical signal corresponding to the identified light emitting characteristics of the optical cable 4. In this case, the external processor 8 may directly obtain the information about the surrounding characteristics of the electronic apparatus 1 or receive the information from the electronic apparatus 1, and thus identify the surrounding characteristics of the electronic apparatus 1.

Like this, the electronic apparatus 1 can control the transparency or the like of the optical cable 4 based on the surrounding characteristics, and thus continue to have effects as if the optical cable 4 is absent even though the surroundings are changed.

Figure 6:
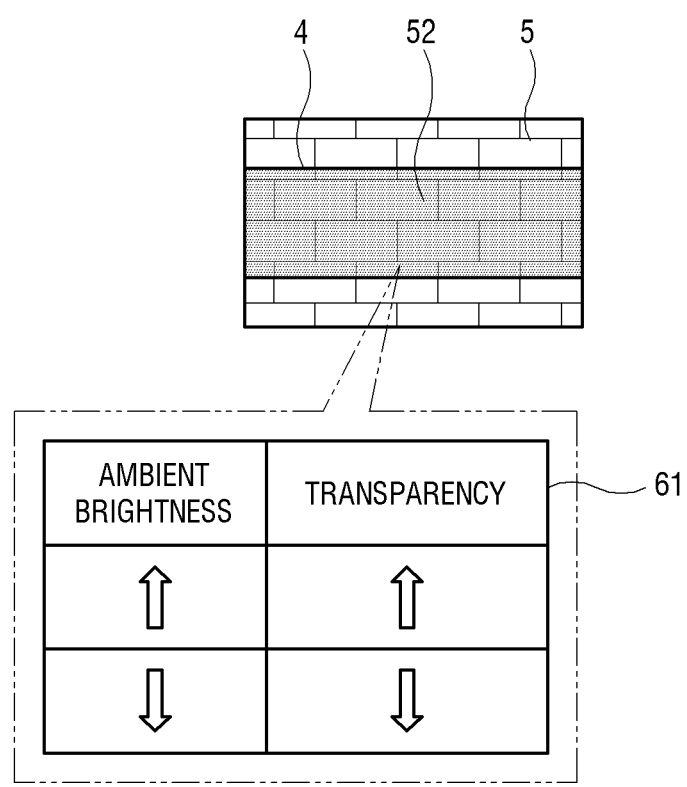
FIG. 6 illustrates an example that transparency of the optical cable is adjusted according to ambient brightness, in relation to the operation S33 of FIG. 3.

FIG. 6 illustrates an example that transparency of the optical cable is adjusted according to ambient brightness, in relation to the operation S33 of FIG. 3. As shown in FIG. 6, the processor 2 of the electronic apparatus 1 may control the light emitting characteristics of the optical cable 4 to be adjusted based on the identified ambient brightness. The optical cable 4 may have the first light emitting characteristics 51 before being adjusted based on the identified ambient brightness and the second light emitting characteristics after being adjusted based on the identified ambient brightness. In this case, the first light emitting characteristics 51 may be an opaque state, and the second light emitting characteristics 52 may be a transparent state.

In this case, the processor 2 may control the second light emitting characteristics 52 to have higher transparency as the ambient brightness gets higher. On the other hand, the processor 2 may control the second light emitting characteristics 52 to have lower transparency as the ambient brightness gets lower. The processor 2 may divide the ambient brightness into a plurality of brightness levels, and control the second light emitting characteristics 52 of the optical cable 4 to have the transparency corresponding to each brightness level. Information 61 about the transparency according to the plurality of brightness levels may be stored as a look-up table in the storage unit 16 or the external storage unit 33

Like this, the electronic apparatus 1 can control the transparency or the like of the optical cable 4 to be adjusted based on the information about the transparency according to the surroundings, thereby efficiently adjusting the transparency or the like.

Figure 7:
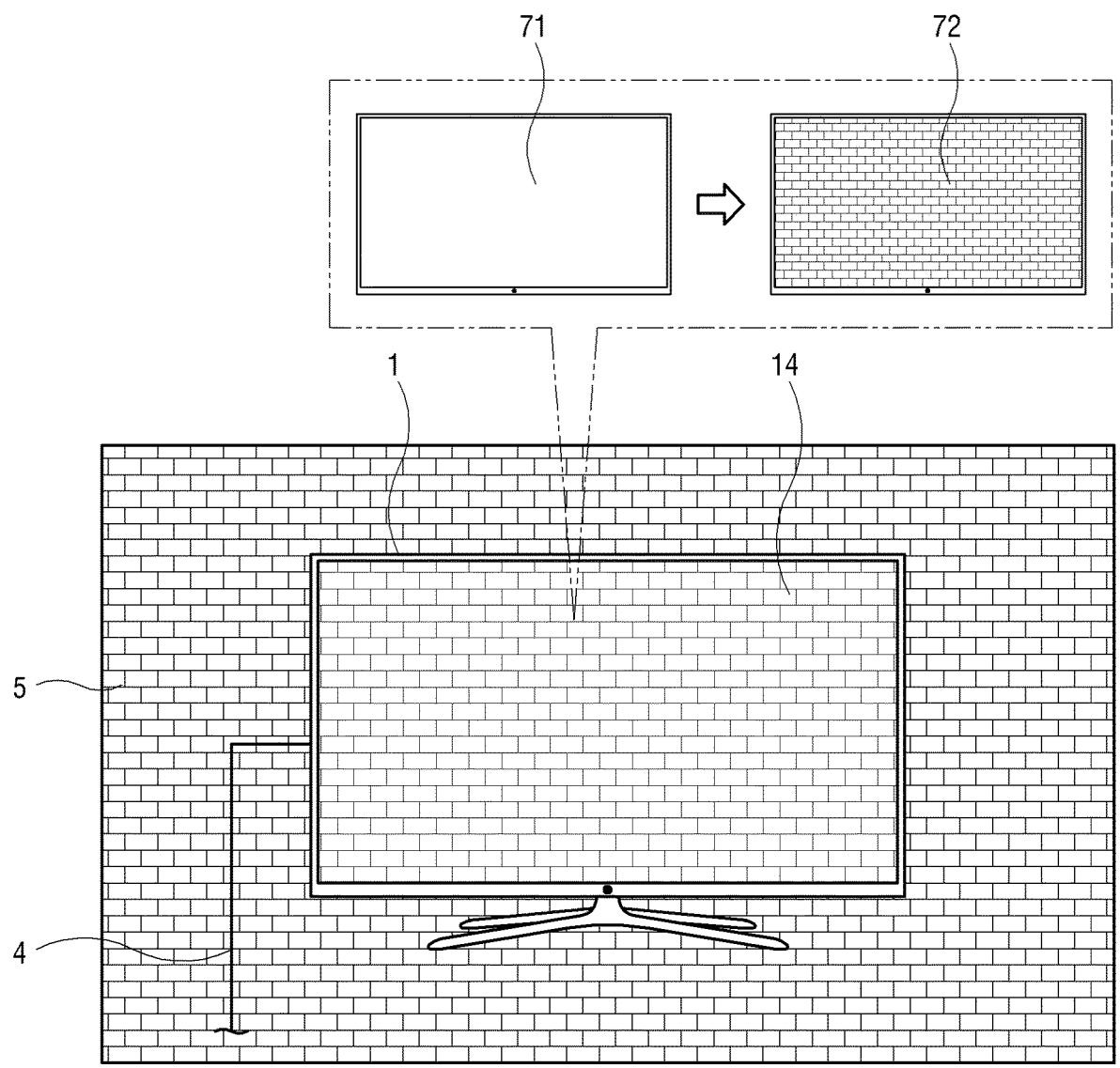
FIG. 7 illustrates an example that a light emitting characteristic of the optical cable is adjusted according to color characteristics of an image displayed on the electronic apparatus, in relation to the operation S33 of FIG. 3.

FIG. 7 illustrates an example that a light emitting characteristic of the optical cable is adjusted according to color characteristics of an image displayed on the electronic apparatus, in relation to the operation S33 of FIG. 3. As shown in FIG. 7, the electronic apparatus 1 may display an image having first color characteristics 71 on the display 14. The first color characteristics 71 may for example include a black color corresponding to a power-off state of the electronic apparatus 1. The processor 2 may adjust the image displayed on the display 14 to have second color characteristics 72 based on a background color characteristic of the electronic apparatus 1, for example, the color of the wall 5. The second color characteristics 72 may have the same or similar color to the color of the wall 5.

In this case, the processor 2 may identify the color of the wall 5 or identify the second color characteristics 72, and control the light emitting characteristics of the optical cable 4 to be adjusted based on the identified color of the wall 5 or the identified second color characteristics 72. In other words, the second light emitting characteristics 52 of the optical cable 4 may represent the color of the wall 5 or a color similar to the color of the wall 5.

Like this, the electronic apparatus 1 controls the light emitting characteristics of the optical cable 4 to be adjusted based on surrounding characteristics, for example, the second color characteristics 72 of the display 14 so that the electronic apparatus 1 and the optical cable 4 can be seen as assimilated into the installation space, thereby making the user 6 visually feel comfortable or stable at the installation space.

Figure 8:
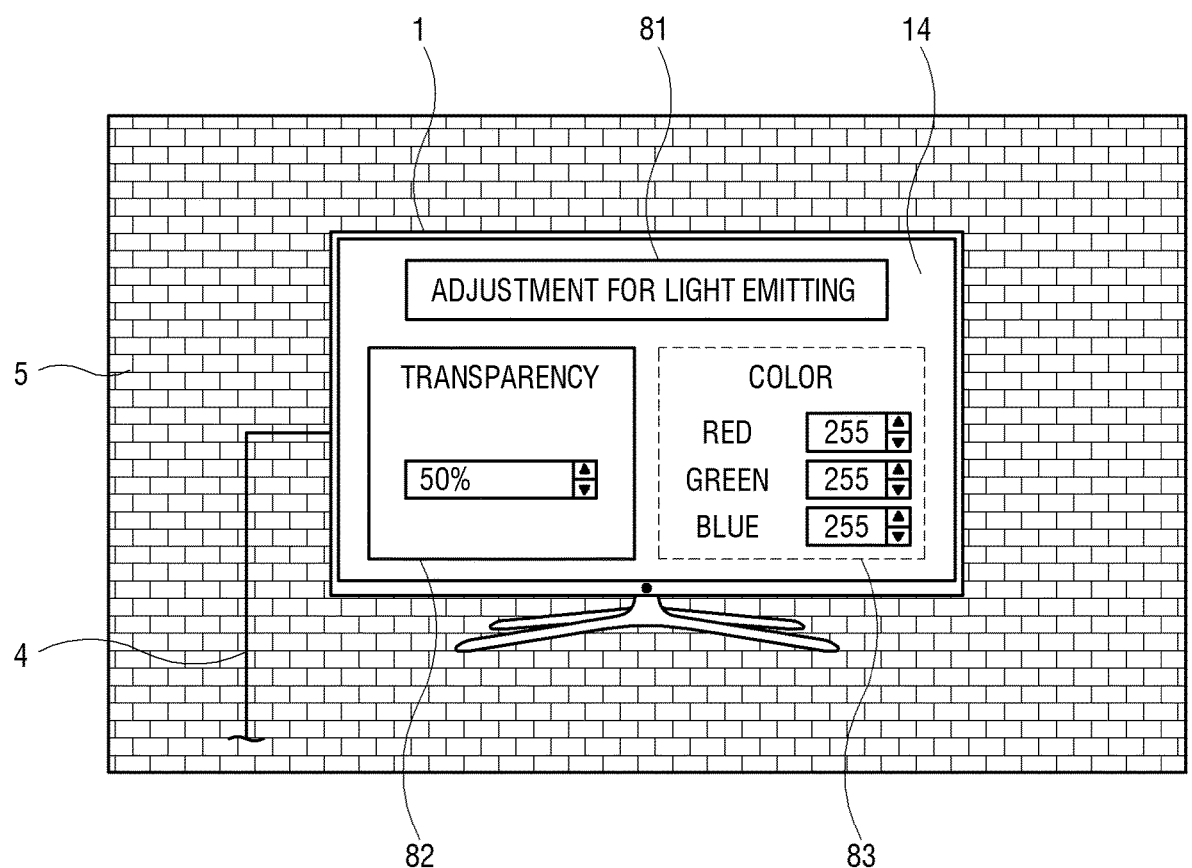
FIG. 8 illustrates an example that the light emitting characteristics of the optical cable is identified based on a user input, in relation to operation S32 of FIG. 3.

FIG. 8 illustrates an example that the light emitting characteristics of the optical cable is identified based on a user input, in relation to operation S32 of FIG. 3. As shown in FIG. 8, the processor 2 may control the display 14 to display an adjustment user interface (UI) 81 for adjusting the light emitting characteristics of the optical cable 4.

The adjustment UI 81 may include a transparency adjustment UI 82 for adjusting the light emitting characteristics, for example, the transparency of the optical cable 4. The processor 2 may identify a transparency input by the user 6 through the transparency adjustment UI 82, and transmit the second optical signal corresponding to the identified transparency to the optical cable 4.

Meanwhile, the adjustment UI 81 may further include a color adjustment UI 83 for adjusting the color of the optical cable 4. The processor 2 may identify a color input by the user 6 through the color adjustment UI 83, and transmit the second optical signal corresponding to the identified color to the optical cable 4.

Like this, the electronic apparatus 1 identifies the light emitting characteristics of the optical cable 4 based on a user input so that the light emitting characteristics of the optical cable 4 can be optimized for the user 6, thereby making the user 6 visually feel comfortable or stable at the installation space.

Various embodiments of the disclosure may be achieved by software including one or more commands stored in a storage medium readable by the electronic apparatus 1 and the like. For example, the processor 2 of the electronic apparatus 1 may call and execute at least one command among one or more stored commands from the storage medium. This enables the electronic apparatus 1 and the like apparatus to operate and perform at least one function based on the at least one called command. The one or more commands may include a code produced by a compiler or a code executable by an interpreter. The machine-readable storage medium may be provided in the form of a non-transitory storage medium. Here, the 'non-transitory' merely means that the storage medium is a tangible device and does not include a signal (for example, an electromagnetic wave), and this term does not distinguish between cases of being semi-permanently and temporarily stored in the storage medium.

For example, methods according to various embodiments of the disclosure may be provided as involved in a computer program product. The computer program product may include instructions of software to be executed by the processor as mentioned above. The computer program product may be traded as a commodity between a seller and a buyer. The computer program product may be distributed in the form of a machine-readable storage medium (for example, a compact disc read only memory (CD-ROM)) or may be directly or online distributed (for example, downloaded or uploaded) between two user apparatuses (for example, smartphones) through an application store (for example, Play Store™). In the case of the online distribution, at least a part of the computer program product may be transitorily stored or temporarily produced in a machine-readable storage medium such as a memory of a manufacturer server, an application-store server, or a relay server.

According to the disclosure, there are provided an electronic apparatus and a control method thereof, in which an optical cable connected between the electronic apparatus and an external apparatus is seen as assimilated into its surroundings, so that a user can visually feel comfortable or stable at the surroundings.

Although a few embodiments have been shown and described, it will be appreciated by those skilled in the art that changes may be made in these embodiments without departing from the principles and spirit of the invention, the scope of which is defined in the appended claims and their equivalents.

What is claimed is:

1. An electronic apparatus comprising:
an optical communicator to which an optical cable is connectable; and
a processor configured to:
control the optical communicator to transmit or receive a first optical signal for optical communication to and from an external apparatus through the optical cable,
identify light emitting characteristics of the optical cable, and
control the optical communicator to transmit a second optical signal corresponding to the identified light emitting characteristics of the optical cable through the optical cable,
wherein the processor is further configured to identify the light emitting characteristics of the optical cable based on surrounding characteristics of the electronic apparatus.

2. The electronic apparatus according to claim 1, wherein the processor is configured to identify the light emitting characteristics of the optical cable based on a received user input.

3. The electronic apparatus according to claim 1, wherein the light emitting characteristics of the optical cable comprise at least one of transparency of the optical cable or color of the optical cable.

4. The electronic apparatus according to claim 3, wherein the processor is configured to:
identify the light emitting characteristics of the optical cable based on ambient brightness of the electronic apparatus, and
control the optical communicator to raise the transparency of the optical cable as the ambient brightness becomes higher.

5. The electronic apparatus according to claim 1, wherein the optical communicator comprises a first optical device that outputs the first optical signal, and a second optical device that outputs the second optical signal,
the first optical device is configured to output the first optical signal to a first fiber of the optical cable, and
the second optical device is configured to output the second optical signal to a second fiber of the optical cable surrounding the first fiber.

6. The electronic apparatus according to claim 1, wherein characteristics of the second optical signal comprise a wavelength of the second optical signal.

7. The electronic apparatus according to claim 1, wherein the surrounding characteristics comprise background color characteristics of the electronic apparatus.

8. The electronic apparatus according to claim 1, wherein the surrounding characteristics comprise ambient brightness of the electronic apparatus.

9. The electronic apparatus according to claim 1, further comprising a display,
wherein the processor is configured to control the light emitting characteristics of the optical cable to be adjusted based on color characteristics of an image displayed on the display.

10. The electronic apparatus according to claim 1, further comprising a display,
wherein the processor is configured to:
display an image on the display based on the first optical signal received from the external apparatus through the optical communicator, and
transmit information about the surrounding characteristics to the external apparatus.

11. The electronic apparatus according to claim 1, wherein the processor is configured to identify the surrounding characteristics based on information received from the external apparatus through the optical communicator.

12. A method of controlling an electronic apparatus, comprising:
transmitting or receiving a first optical signal for optical communication to and from an external apparatus through an optical cable;
identifying light emitting characteristics of the optical cable; and
transmitting a second optical signal corresponding to the identified light emitting characteristics of the optical cable through the optical cable,
wherein the identifying the light emitting characteristics of the optical cable comprises identifying the light emitting characteristics of the optical cable based on surrounding characteristics of the electronic apparatus.

13. The method according to claim 12, wherein the identifying the light emitting characteristics of the optical cable comprises identifying the light emitting characteristics of the optical cable based on a received user input.

14. The method according to claim 12, wherein the light emitting characteristics of the optical cable comprise at least one of transparency of the optical cable or color of the optical cable.

15. The method according to claim 14, wherein the identifying the light emitting characteristics of the optical cable comprises identifying the light emitting characteristics of the optical cable based on ambient brightness of the electronic apparatus, and
the transmitting the second optical signal comprises raising the transparency of the optical cable as the ambient brightness becomes higher.

16. The method according to claim 12, wherein characteristics of the second optical signal comprise a wavelength of the second optical signal.

17. The method according to claim 12, wherein the surrounding characteristics comprise background color characteristics of the electronic apparatus.

18. The method according to claim 12, wherein the surrounding characteristics comprise ambient brightness of the electronic apparatus.

* * * * *